March 7, 1967  C. WOLFE, JR  3,307,264
GRADING INSTRUMENTS
Filed Nov. 17, 1965  2 Sheets-Sheet 1
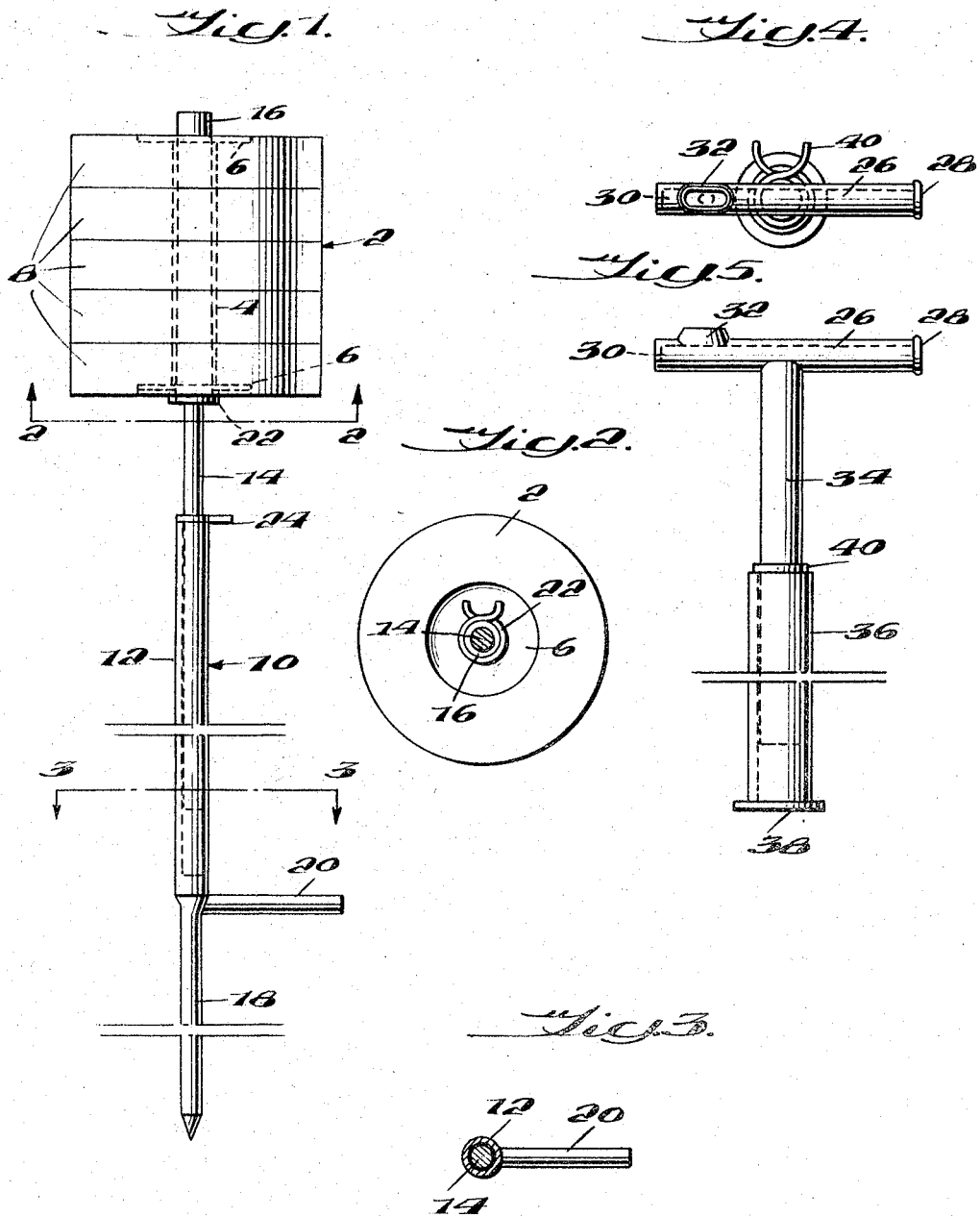
INVENTOR
CHARLES WOLFE, JR.
BY
Burns, Doane, Benedict, Swecker & Mathis
ATTORNEYS

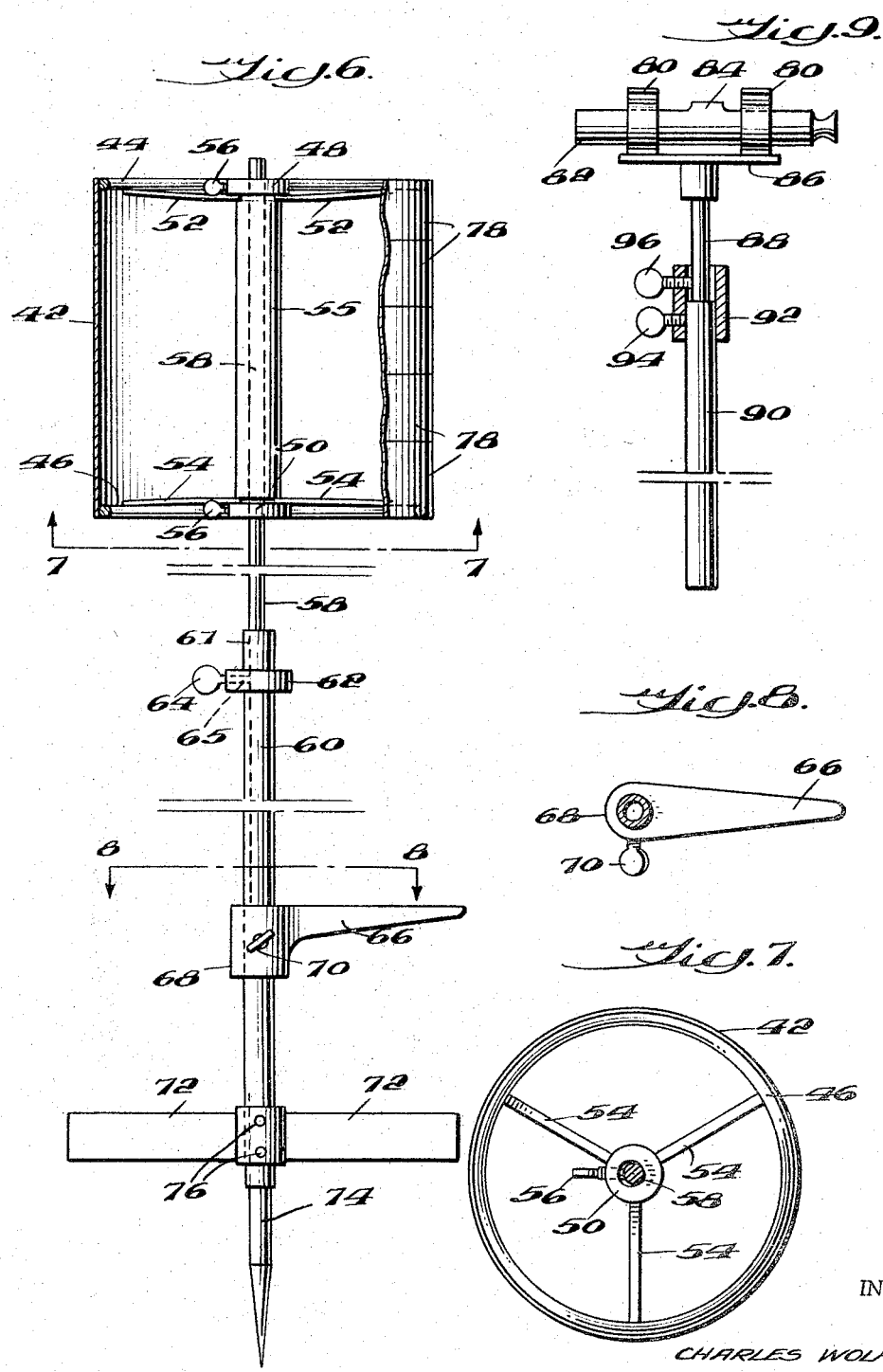

United States Patent Office 3,307,264
Patented Mar. 7, 1967

3,307,264
GRADING INSTRUMENTS
Charles Wolfe, Jr., 269 N. Washington St.,
Bloomfield, Ind. 47424
Filed Nov. 17, 1965, Ser. No. 514,742
7 Claims. (Cl. 33—73)

This invention relates to grading instruments and, more particularly, to apparatus for determining the distance of an actual grade above or below a desired grade elevation. This is a continuation-in-part of my copending application, Serial No. 318,250, filed October 23, 1963, now abandoned.

In constructing level surfaces, such as roadbeds, surface drains or waterways in areas where the ground is uneven, it is necessary to cut and remove high ground and to fill in valley areas to the desired grade elevation. The elevation of the desired grade is usually established by a surveyor and stakes are driven at convenient intervals to indicate the amount of cutting or filling required to bring the ground to the desired grade elevation. As the grading progresses, it is necessary to check continuously the actual grade elevation. The equipment operator cannot do this himself, but must rely on the surveyor to check the ground elevation and to notify the operator when the desired grade elevation has been reached.

A disadvantage of this system is that the operator must wait for the surveyor to check his work. Often, the operator and the grading equipment remain idle, while the operator waits for the surveyor to come to the site to check the new ground elevation. Furthermore, the use of highly skilled surveyors to do the checking is expensive, and the cost could be substantially reduced if the operator were able to check his own work while he is cutting and filling to the desired grade elevation.

Although devices have been suggested for enabling the equipment operator to check his work, the instruments are relatively complex. Furthermore, he must be familiar with the general survey of the area and know the numerical height of the desired grade at the location where he is working. The average equipment operator does not have sufficient experience to be able to use such instruments, and the numerical readings lead to errors in determining the desired grade elevation. Therefore, these instruments are impractical for the workmen to use.

Another method for indicating to the equipment operator the desired grade elevation is to insert stakes or markers in the ground at convenient intervals. A ribbon on the stake indicates whether a cut or fill is to be made and the depth of the cut or fill is marked on the stake. One disadvantage of this method is that the stakes are placed in the path of the grading equipment, so that they interfere with the grading operation. It is necessary to work around the stakes to reach the desired grade elevation. If fill is required, the stake may be completely covered over and disappear from sight. Furthermore, the numbers on the stakes cannot be read from the driver's seat on the earth mover.

Accordingly, it is an object of this invention to provide apparatus to enable equipment operators to determine the height of the ground above or below the desired grade elevation.

It is a further object of this invention to provide apparatus for determining the desired grade elevation which does not interfere with the grading operation.

A still further objection of this invention is to provide a portable grading instrument which is adjustable for various heights above the actual grade elevation.

It is a still further object of this invention to provide a grading instrument in which the indicia may be interpreted by a workman, without reference to a survey.

These objects are accomplished in accordance with a preferred embodiment of the invention by a cylinder mounted on a post and having its central axis extending upright. The post may be adjusted to vary the height of the cylinder above the ground. The cylinder has a plurality of color bands extending around the outside surface of the cylinder. A sighting instrument, which includes an eyepiece and spirit level, is mounted on a post, the height of which may be adjusted to correspond to the height of the cylinder above the desired grade elevation.

The color of each band indicates graphically the distance of that band above the bottom of the cylinder, which is a known distance above the desired grade elevation. The pole on which the eyepiece is mounted is adjusted to the same length as the height of the end of the cylinder above the desired grade elevation. By placing the pole on the grade and, when it is level, sighting through the eyepiece at the cylinder, the height of the actual ground surface above or below the desired grade elevation readily can be determined. If a band of a certain color is sighted through the eyepiece, it indicates to the equipment operator the height of the actual grade above the desired grade elevation. Since the operator has learned the significance of the color bands, he knows the distance above or below the desired grade elevation represented by the color sighted through the eyepiece. The pole on which the eyepiece is mounted can be placed at any location in the working area, and the post and the cylinder are set up by the surveyor at a remote location which is visible from the work area. The post and cylinder, therefore, are not disturbed by the construction work.

This preferred embodiment of the invention is illustrated in the accompanying drawings, in which:

FIG. 1 is a side elevational view of the target apparatus of this invention;

FIG. 2 is a cross-sectional view of the target apparatus along the line 2—2 of FIG. 1;

FIG. 3 is a cross-sectional view of the target apparatus along the line 3—3 of FIG. 1;

FIG. 4 is a top plan view of the sighting instrument of this invention;

FIG. 5 is a side elevational view of the sighting instrument;

FIG. 6 is a side elevational view, partially in cross section, of a modified form of the target apparatus;

FIG. 7 is a cross-sectional view along the line 7—7 in FIG. 6;

FIG. 8 is a cross-sectional view along the line 8—8 in FIG. 6; and

FIG. 9 is a side elevational view of a modified form of the sighting instrument.

The apparatus of this invention includes a target, as shown in FIG. 1, and a sighting instrument, as shown in FIG. 5. The target includes a cylinder 2, which may be hollow or solid. A solid cylinder is shown in FIG. 1 and a tube 4 is mounted in a central bore in the cylinder. Washers 6 are secured in the opposite ends of the cylinder 2. The outer surface of the cylinder 2 is provided with a plurality of color bands 8. The bands are each of a different color.

The cylinder 2 is supported on a post 10 which includes a tube 12 in which is telescoped a rod 14. The rod 14 has a portion 16 of substantially the same diameter as the outside diameter of the tube 12. The portion 16 is slightly longer than the length of the cylinder 2 and extends through the tube 4. The lower end of the tube 12 is provided with a spike 18 for supporting the post 10 upright in the ground. A foot bar 20 on the tube 12 facilitates pushing the post 10 into the ground.

The height of the cylinder 2 relative to the tube 12 is adjusted by means of a spring clamp 22 which engages the enlarged portion 16 of the rod 14. Another clamp 24, which is substantially the same as the clamp 22, adjusts the position of the rod 14 relative to the tube 12. Since the tube 12 has substantially the same outside diameter as the portion 16, the cylinder 2 may also be mounted on the tube 12.

The sighting instrument is shown in FIGS. 4 and 5. An eyepiece 26 is formed of a hollow tube having lenses 28 and 30 mounted in opposite ends of the tube. For greater accuracy, conventional cross hairs may be mounted in the tube 26. A spirit level 32 is mounted on the tube 26, with the cover glass of the level being substantially parallel to the central axis of the tube 26, so that the level 32 indicates the levelness of the tube 26.

The eyepiece 26 is secured to a pole 34 and the pole 34 is mounted in telescoping relation in a tubular base 36. The base 36 is provided with a bearing plate 38 which extends across the end of the base 36. A spring clamp 40 engages the pole 34 for preventing relative movement of the pole into the base 36.

Assuming that a road surface is to be constructed, preliminary surveys are made to determine grades, lengths and elevations. The post 10 is upright in the ground at a location adjacent to the roadbed where it is visible from the roadbed, but away from the spoil area. The foot bar 20 facilitates insertion of the spiked end 18 of the post 10 in the ground. The height of the eyepiece 26 above the plate 38 is then adjusted by sliding the pole 34 relative to the base 36. The clamp 40 is released by pressing the ends of the spring clamp toward each other, thereby permitting the pole 34 to move relative to the clamp 40.

The rod 14 of the target is adjusted relative to the tube 12 in the same manner as the pole 34 of the sighting instrument, by releasing the spring clamp 24. The cylinder 2 is mounted on the post 10 at a height relative to the ground which corresponds to the height of the eyepiece 26 above the desired grade elevation. The cylinder 2 is mounted on the enlarged portion 16 of the rod 14, if the height of the aiming point is to be higher from the ground than the length of the tube 12. If the height of the aiming point above the ground is less than the height of the tube 12, then the rod 14 and the clamp 24 are removed from the tube 12, and the tube 4 of the cylinder 2 is mounted in telescoping relation over the tube 12. The spring clamp 22 engages the outside surface of the tube 12 to maintain the cylinder at the desired height relative to the ground.

The cylinder 2 has a plurality of color bands on its surface. The top band, for example, may be green, the next band may be white, the third band may be orange, the fourth band may be yellow, and the bottom band may be red. The end of the cylinder adjacent the red band is the aiming point and corresponds to the desired grade elevation, as sighted through the eyepiece 26.

In using the apparatus of this invention to determine a desired grade elevation below the ground level, the cylinder is mounted on the post 10 in the manner described, and as the cutting progresses, the equipment operator places the plate 38 of the sighting instrument on the ground at the location of the cut and sights through the tube 26, after checking the level 32 to insure that the eyepiece 26 is horizontal. The color band which the operator sees through the eyepiece 26 indicates the height of the ground surface above the desired grade elevation. The operator merely learns the sequence of color bands, so that he can determine from the color how much earth must be removed before the grade elevation is reached. For example, a green band on the cylinder 2 may indicate five-tenths of a foot to the desired grade elevation. The white band may indicate fourth-tenths of a foot. The orange band indicates caution and three-tenths of a foot to the grade line. The yellow band indicates extreme caution and two-tenths of a foot to the grade line. The red band indicates one-tenth of a foot to the grade line, and cutting stops at the bottom of the red band, which is the lower end of the cylinder. Thus, the laborer can determine his relative elevation, without referring to numerical data, and without resorting to supplementary surveys to check his work.

In making a fill, the same procedure is used, except that the cylinder 2 is turned upside down, so that the top band is red, the next band is yellow, the next band is orange, the fourth band is white and the bottom band is green. As the earth filling progresses, the target is sighted through the horizontal tube 26, with the plate 38 resting on the fill and the color band sighted indicates the height of the ground surface below the desired grade elevation. When the red band is sighted, the earth filling is within one-tenth of an inch of the desired grade elevation and when the top of the cylinder is sighted through the eyepiece 26, the ground level is on the desired grade elevation.

A modified form of the target apparatus is shown in FIGS. 6, 7 and 8. The target includes a hollow, thin walled cylinder 42. Rings 44 and 46 are secured around the inside of the cylinder at each opposite end. Collars 48 and 50 are provided at each opposite end of the cylinder and are secured to the respective rings 44 and 46 by a plurality of spokes 52 and 54. The collars 48 and 50 are arranged substantially in axial alignment, and a tube 55 extends between the collars 48 and 50. The tube 55 is secured to the collars in substantial axial alignment with the central openings in the collars. Each of the collars has a thumb screw 56 which extends into the opening in the center of the collar.

The cylinder 42 is mounted on a rod 58 which extends through the central openings in the collars 48 and 50 and through the tube 55. The thumb screws 56 are tightened against the rod 58 to clamp the rod between the end of the screw and the opposite side of the collar opening. The rod 58 extends in telescoping relation into a hollow tube 60. A clamp ring 62 is mounted near the top end of the tube 60 by means of a thumb screw 64 which engages the rod 58. A radial hole 65 is formed in the tube 60 and the thumb screw extends through the hole 65 to engage the rod 58. The presence of the screw 64 in the hole 65 also prevents the ring 62 from being displaced along the tube 60.

A grade line marker 66 is also mounted on the tube 60. The marker 66 has a tubular sleeve portion 68 through which the tube 60 extends. A thumb screw 70 in the sleeve portion 68 engages the tube 60. The outer end of the marker 66 is spaced a greater distance from the tube 60 than the radius of the cylinder 42, so that a survey rod may be supported vertically on the marker 66 without engaging the cylinder 42. A foot bar 72 is mounted at the lower end of the tube 60 to facilitate pushing the tube 60 into the ground. A sharp point 74 is inserted in the lower end of the tube 60. Both the foot bar 72 and the point 74 are secured to the tube 60 by screws 76 which extend through the foot bar 72 and the tube 60 into engagement with the point 74.

The central openings in the collars 48 and 50 which support the cylinder 42 and the internal diameter of the tube 55 are slightly larger than the outside diameter of the tube 60, so that the cylinder may be mounted either on the rod 58, as shown in FIG. 6, or on the tube 60. Accordingly, the rod 58 and the tube 60 form an upright post of adjustable height for mounting the cylinder 42 at a selected elevation above the ground level. The cylinder 42 has color bands 78 similar to the color bands 8 on the cylinder 2 shown in FIG. 1. Since the sequence of the color bands indicates the proximity to the desired grade elevation, it may be necessary to invert the cylinder so that the final color band 78 is located at the top instead of the bottom. The collars 48 and 50 are substantially identical, to permit either end of the cylinder to be positioned at the top. In order to mount the cylinder 42 on the tube 60, the screw 64 of the clamp 62 is unscrewed sufficiently to allow the clamp to move downwardly along the tube 60. The cylinder 42 may then be assembled on the tube 60 by unscrewing the thumb screws 56 and passing the tube 55 over the tube 60 and then tightening the thumb screws 56. If necessary, the marker 66 may be moved downwardly toward the foot bar 72 to allow positioning of the cylinder 42 on the tube 60. The elevation of the cylinder 42 relative to the tube 60 may be adjusted so that one end of the cylinder is positioned at a predetermined height above or below the desired grade elevation. The grade line marker 66 also may be adjusted along the tube 58 or 60 by loosening and then retightening the screw 70. Usually, the grade line marker is fixed at a predetermined distance above the proposed grade line.

A modified form of the sighting instrument is shown in FIG. 9. The sighting instrument includes a pair of U-shaped brackets 80 for receiving a sighting level 82. Preferably, the sighting level includes a magnifying eyepiece and a level indicating device 84 which may be observed by looking through the eyepiece. The brackets 80 are mounted on a base 86 having a cylindrical socket in which a rod 88 is secured. The rod 88 extends in telescoping relation into a tube 90. The tube and the rod may be clamped together to prevent relative axial movement by means of a sleeve 92 having a thumb screw 94 in position to engage the tube 90 and a second thumb screw 96 in position to engage the rod 88. By adjusting the relative positions of the rod and tube, the height of the sighting level 82 may be set at a predetermined elevation above the lower end of the tube 90. Preferably, the lower end of the tube 90 is blunt so that it will not penetrate soft ground.

In using the target apparatus of the modified form of the invention, the post, which includes the tube 60 and the rod 58, is inserted in the ground by pressing the pointed end of the tube 60 into the ground by means of the foot bars 72. The position of the grade line marker 66 may then be fixed along the length of the tube 60 at a predetermined height above or below the proposed grade elevation. The cylinder 42 is then selectively mounted either on the rod 58 or on the tube 60, depending upon the height of the aiming point relative to the tube 60. Because of the combinaion of the collars 48 and 50 and the clamp ring 62, the cylinder 42 may be mounted either on the rod 58 or on the tube 60, or one end of the cylinder may be mounted on the rod and the other end may be mounted on the tube 60. When the target apparatus is properly assembled and mounted upright in the ground, the sighting level may be used by an earthmoving machine operator to determine how close the present grade elevation is to the proposed grade elevation. The height of the sighting level 82 above the ground may be adjusted to a predetermined level by means of the clamp 92. When the operator sights through the sighting level 82, which is at a predetermined elevation above the present grade elevation, he can determine from the color band that he sees on the cylinder 42 how close he is to the desired grade elevation.

Whether making a fill or cutting, the operator merely has to remember the color code to know how far the ground surface is from the desired grade elevation. Several targets may be set up at convenient intervals along the roadbed. The sighting level, which is carried with the workman, is relatively rugged in construction and may be used easily by unskilled persons. Since the targets are usually set up by the surveyor, their accuracy is assured. The machine operator merely uses the sighting instrument to determine his position relative to the target, and does not need to understand the principles of surveying.

While this invention has been illustrated and described in several embodiments, it is recognized that variations and changes may be made therein without departing from the invention as set forth in the claims.

I claim:

1. A grading instrument comprising a post, a target, said post including a rod and a tube, said rod mounted in telescoping relation in said tube, means for releasably clamping together said rod and tube, said target having a longitudinal bore therein, said tube and a portion of said rod having substantially the same outside diameter, said target bore having a larger diameter than said tube and rod, means for clamping said target selectively to said tube and said rod, and means for supporting the tube upright, whereby the height of the target relative to the post is adjustable.

2. In combination, a target and a sighting instrument, said target comprising a post, means bearing indicia, said post including a rod and a tube, said rod mounted in telescoping relation in said tube, means for releasably clamping together said rod and tube, said indicia bearing means having a longitudinal bore therein, said tube and a portion of said rod having substantially the same outside diameter, said target bore having a larger diameter than said tube and rod, means for clamping said indicia bearing means selectively to said tube and said rod, and means for supporting the tube upright, whereby the sighting instrument determines the grade level relative to the target.

3. A target and a sighting instrument combination according to claim 2 wherein said indicia bearing means includes a cylinder having a plurality of color bands on the surface thereof, said bands being spaced uniformly from one end of said cylinder and having equal widths and extending circumferentially of said cylinder.

4. A target and a sighting instrument combination according to claim 2 wherein said sighting instrument includes an optical sighting level and means for supporting the level at a predetermined height relative to the ground surface, whereby the target may be adjusted to a predetermined elevation and by sighting the indicia on the target through the level the elevation of the target relative to the level is known.

5. The combination according to claim 4 wherein said level supporting means includes a tube and a rod received in telescoping relation therein, and means for adjusting the rod longitudinally relative to the tube.

6. A grading instrument comprising a post, a target, said target being cylindrical, means mounting the target on the post, said target having indicia thereon, said indicia being spaced longitudinally along the target from one end thereof and extending uniformly around the circumference of said target at predetermined locations relative to a reference point on said target, said target having a longitudinal bore therein of a larger diameter than said post, said post extending through said longitudinal bore, and means for restricting the longitudinal movement of said target with respect to said post, said post including a rod and a tube, said rod being mounted in telescoping relation in said tube, means for releasably clamping together said rod and tube, said indicia including a plurality of color bands thereon extending around the circumference of said target, said restricting means including means for clamping said target selectively to said tube in said rod, and means for supporting the tube upright, whereby positions relative to a proposed grade are indicated.

7. A grading instrument comprising a post, a target, said target having a longitudinal bore therein, said target bore having a larger diameter than said post and being in the form of a pair of collars spaced apart and having a tube extending between said collars, said target including a hollow cylinder mounted axially of said tube, the central openings of said collars and said tube being in substantial axial alignment, and means for selectively clamping said post in telescoping relation in said longitudinal bore, whereby the height of the target relative to the post is adjustable.

References Cited by the Examiner

UNITED STATES PATENTS

| | | | |
|---|---|---|---|
| 341,690 | 5/1886 | Reichenbach | 33—74 |
| 419,711 | 1/1890 | Rogers | 33—74 |
| 1,891,573 | 12/1932 | Phelps | 33—74 |
| 2,077,828 | 4/1937 | Dombrowski | 33—111 |
| 2,689,403 | 9/1954 | Wilkerson | 33—46.2 |
| 2,835,036 | 4/1958 | Peresenyi | 33—74 |
| 3,195,234 | 7/1965 | Glidden et al. | 33—74 |

LEONARD FORMAN, *Primary Examiner.*

W. K. QUARLES, Jr., *Assistant Examiner.*